United States Patent [19]

MacDonald et al.

[11] 3,842,515

[45] Oct. 22, 1974

[54] METHOD FOR DRYING WATER-WET MEMBRANES

[75] Inventors: William MacDonald, Sherwood Park; Chuen-Yong Pan, Edmonton, Alberta, both of Canada

[73] Assignee: Alberta Helium Limited, Calgary, Albert, Canada

[22] Filed: Sept. 26, 1973

[21] Appl. No.: 400,900

Related U.S. Application Data

[63] Continuation-in-part of Ser. No. 307,874, Nov. 20, 1972, abandoned.

[52] U.S. Cl. ............................................ 34/9, 55/16
[51] Int. Cl. ............................................ F26b 3/00
[58] Field of Search ......................... 34/9, 80; 55/16

[56] References Cited
UNITED STATES PATENTS

| | | | |
|---|---|---|---|
| 1,687,588 | 10/1928 | Pearson | 34/9 |
| 1,829,763 | 11/1931 | Schorger | 34/9 |
| 3,415,038 | 12/1968 | Merten et al. | 55/16 |
| 3,791,044 | 2/1974 | Buske et al. | 34/9 |

*Primary Examiner*—John J. Camby
*Attorney, Agent, or Firm*—Millen, Raptes & White

[57] ABSTRACT

A water-wet cellulose ester membrane, such as the asymmetric cellulose acetate membrane in sheet or tubular forms used for water desalination by reverse osmosis, is dried by: (1) immersing it in water-soluble alcohol at low temperatures until the water is replaced by alcohol; (2) immersing the alcohol-wet membrane in an alcohol-soluble organic liquid at low temperatures until the alcohol is replaced by the liquid; and (3) drying the product at ambient temperature. In this manner, the membrane is quickly dried without collapsing the walls of its pores. Upon rewetting, the membrane will regain most of its original reverse osmosis properties. For gas permeation the separation capabilities of dried membrane may be improved by heat treatment.

15 Claims, No Drawings

METHOD FOR DRYING WATER-WET MEMBRANES

CROSS-REFERENCE TO RELATED APPLICATION

This application is a continuation-in-part of our application for U.S. Letters Pat. Ser. No. 307,874, filed Nov. 20, 1972, now abandoned.

BACKGROUND OF THE INVENTION

This invention relates to a method for drying a water-wet cellulose ester membrane.

Cellulose ester membranes in flat sheet or hollow fiber forms are useful for water desalination by reverse osmosis, and gas separation by permeation. Typical cellulose esters include cellulose acetate with varying acetyl content between di- and triacetate, cellulose acetate butyrate, cellulose acetate methacrylate, and cellulose propionate. The most commonly used material is cellulose acetate with 38 – 40 percent acetyl. The properties of these membranes are usually given in terms of their permeation flux and selectivity. The permeation flux is a measure of the rate at which helium of methane permeats through the membrane. It is usually desirable to have a high permeation flux number. Selectivity is an indication of the ratio of the helium/methane permeation fluxes. Again, it is usually desirable to have a high selectivity number. Since the gas or liquid permeation flux through the membrane is inversely proportional to the membrane thickness, it is desirable to make the membrane as thin as possible. Loeb and Souriragan have developed highly asymmetric membranes of cellulose esters (see UCLA Rept. 60—60, 1960). These membranes have an asymmetric structure consisting of a few tenths of a micron thick dense layer supported by a 50 – 100 microns thick highly porous substructure. This substructure has pores of 0.1 – 1.0 micron in diameter. Its only function is to support the thin dense skin layer which functions as the effective separating layer. Typical asymmetric membranes of this type are cellulose acetate films sold by Eastman Kodak under the designation of KP-96 and KP-98. Such membranes have also been manufactured in hollow fiber form with the thin dense skin layer located on the outside of the fiber. As used herein, the term "membrane" is intended to encompass both the flat film and hollow fiber or tubular film.

Another class of cellulose ester membrane is symmetric and highly porous. As such it is not useful for reverse osmosis or gas permeation but may be used for ultrafiltration or by coating with a suitable thin layer may be converted into an asymmetric membrane for reverse osmosis or gas permeation.

The membranes, as manufactured, are in a water-saturated condition. For some applications, such as water desalination, they are usable in the water-wet condition. However, for other applications, such as separation of helium from natural gas, they must be in the dry state. The membranes in the water-wet state contain large quantities of water (60 – 70 weight percent) and are subject to hydrolysis and bacterial attack in storage. The potential advantages in drying these membranes include easier handling, shipping and storage.

Drying these materials is not a simple matter. If the water is simply evaporated from the membane, the pore structure collapses due to the action of interfacial tension forces created by the retreating water. When the product is re-wetted, it is found that its desirable separation capabilities have been lost.

The prior art suggests soaking the water-wet membrane in a non-polar or weakly polar solvent, such as carbon tetrachloride, tetrachloroethylene, toluene or p-xylene, to exchange or replace the water in the membrane with the solvent. The solvent-wet membrane is then dried, with little damage to the pore structure. However these organic liquids are not water soluble; as a result, it takes hours to carry out the exchange. This delay makes the procedure impractical when practised on a large scale.

The use of two solvents, an alcohol followed by a hydrocarbon has been described by Merten and Gantzel for flat sheet membranes in U.S. Pat. No. 3,415,038. They use isopropanol for one-half hour, followed by toluene for several hours, both at room temperature. Our process is an improvement on this because it gives less damage to the permeation properties of the membrane, can be carried out more rapidly and can be applied to hollow fiber membranes as herein described.

Another prior art technique involves freezedrying, i.e. quickly freezing the water-wet membrane and then subjecting it to vacuum sublimation at −10°C. This procedure involves considerable care to achieve good results and is expensive to practise.

SUMMARY OF THE INVENTION

It is therefore the object of this invention to provide a method for drying cellulose ester membranes in a relatively short period of time with a minimum of damage to the pore structure.

In accordance with the invention, the water in the membrane is first leached out and replaced with water-soluble alcohol. The alcohol is, in turn, replaced with a non-polar alcohol-soluble organic liquid. As used herein, the term "non-polar" is intended to encompass weakly polar liquids such as toluene, simple ethers and fully halogenated hydrocarbons. The organic liquid is then removed from the membrane by drying at ambient conditions. The small interfacial tension forces between the non-polar organic liquid in the pores and the pore walls allow the liquid to be removed without pulling the pore structure into collapse. The entire operation can be carried out in a matter of minutes, and the dry product, when re-wetted with water, is found to have regained most if not all of its original reverse osmosis properties. The dried membrane can be rewetted by water in a few hours or by a surfactant solution in a few minutes. If the water-wet membrane is soaked in a dilute surfactant solution prior to the solvent exchange operations, the dried membrane can be rewetted by water in a few minutes.

In a feature of the invention, the replacement operations are carried out at low temperatures, such as 0°C. By practising the method in this manner, the membrane structure is stiffened during the time that pore wall collapse is likely to occur. It is found that, when the process is practised at low temperature, the product is less damaged than would otherwise be the case. It has further been found that the resultant dried membrane will have an improved separation capability for a mixture, such as natural gas-helium, if the membrane is subsequently heat-treated, for example at about 95°C for a short period.

Broadly stated, the process comprises the steps of (1) immersing the membrane in water-soluble alcohol at low temperature for a sufficient period of time so as to replace substantially all the water with alcohol; (2) immersing the membrane in non-polar alcohol-soluble organic liquid at low temperature for a sufficient period of time so as to replace the alcohol with the organic liquid; and (3) drying the organic liquid-wet membrane to produce a dry membrane.

DESCRIPTION OF THE PREFERRED EMBODIMENT

Any alcohol which does not dissolve the membrane and which is water-soluble can be used as the first exchange liquid. The following group of alcohols have been found satisfactory:

1. Monohydric alcohols - preferably methanol, ethanol, 1-propanol, 2-propanol, tertbutanol and 1-butanol;
2. Ether-alcohols - preferably 3-methoxy-1-butanol; and
3. Dihydric alcohols - preferably 1, 2 propanediol.

Any organic liquid which does not dissolve the membrane and which is alcohol-soluble can be used as the second exchange liquid. The following group of organic liquids have been found satisfactory:

1. Aliphatic hydrocarbons, preferably pentanes, hexanes, heptanes and octanes;
2. Alicyclic hydrocarbons, preferably cyclobutane, cyclopentane, cyclohexane and 1, 3-dimethyl cyclohexane;
3. Aromatic hydrocarbons, preferably benzene and toluene;
4. Ethers, preferably ethyl ether and isopropyl ether;
5. Halogenated hydrocarbons, preferably carbon tetrachloride, and 1, 1, 2-trichlorotrifluoroethane; and
6. Hydrocarbon sulfides, preferably carbon disulfide.

It is to be noted that some of the second solvents are not soluble in some of the first solvents. In selecting the solvent pairs, the solubility between the solvents should be taken into consideration.

Alcohols which have only limited solubilities for water may also be used as the first solvents, e.g. 1-butanol which dissolves about 7 percent water at room temperature is a satisfactory solvent (see Example 5). However, as the water solubility of the alcohol decreases, the time for exchange increases.

For the asymmetric flat film, the solvent replacement process can occur on both sides of the membrane. If the water-wet membrane has been annealed at high temperature to increase its salt rejection capability, however, the solvent replacement will proceed mainly through the porous side of the membrane. In the case of drying hollow fibers continuously, the solvent replacement operation can only proceed through the outside skin layer. If the fiber has not been highly annealed, most of the solvents described above can work satisfactorily. If the fiber has been highly annealed, however, then the structure of the skin layer is so tight that solvents of large molecules would not be easily able to penetrate the fiber skin. Under such conditions, solvents of small molecular size must be selected. For example, the asymmetric cellulose acetate hollow fiber annealed at 85°C water for 30 minutes could not be properly dried using isopropanol and n-heptane. But methanol/ethyl ether was found to work satisfactorily. Alternatively the hollow fibers can be dried after they are cut to length and assembled in a module for reverse osmosis or permeation. In this case the solvents are pumped through the bores of the fibers and any of the above mentioned solvent pairs may be used.

The invention will be more clearly understood by referring to the following examples:

EXAMPLES

Example 1

This example illustrates one embodiment of the invention. An 8 inch by 12 inch sheet of Eastman KP-96 cellulose acetate membrane was removed from a water bath and the superficial water removed with a paper towel. The film was then immersed in a 0°C ethanol bath (98 percent ethanol, 2 percent water) of about 1 inch in depth for 5 minutes with some agitation to exchange the imbibed water for ethanol. Removal of the film from ethanol solution was followed by draining of the superficial ethanol in ethanol atmosphere just above the bath and immediate immersion into a hexanes bath of 1 inch in depth for 5 minutes at 0°C, to exchange ethanol with hexanes; again the bath was agitated. The film was then removed from hexanes and allowed to air dry on top of a paper towel. The dried film was white and opaque and had the following properties:

| | | |
|---|---|---|
| helium permeation flux | = | $2.28 \times 10^{-4}$ cc(STP)/cm$^2$, sec., cm-Hg |
| helium/methane separation factor (helium flux/methane flux) | = | 57 |

All the permeation fluxes (per unit pressure differential across the membrane) in this and subsequent examples, were measured at room temperature (24°C). In addition, the methane flux was measured at 100 psig, unless otherwise specified. The effect of pressure on methane flux is given in example 10. The helium flux, however, is generally independent of measuring pressure.

Example 2

This example shows that an alcohol with only a limited solubility for water may be used as the first solvent.

The Eastman KP-98 membrane was treated at 0°C with 1-butanol and n-heptane as the first and second solvents. The solubility of water in 1-butanol is about 7 weight %. The solvent exchange operations were carried out as described under Example 1 with the exception that the exchange times for water to 1-butanol and 1-butanol to n-heptane were 12 and 5 minutes, respectively. Following are the characteristics of the dried membrane.

| | | |
|---|---|---|
| helium permeation flux | = | $2.78 \times 10^{-4}$ cc(STP)/cm$^2$, sec. cm-Hg |
| helium/methane separation factor | = | 62 |

Example 3

This example shows that dihydric alcohols may be used as the first solvent.

The Eastman KP-98 membrane was treated at 0°C with propylene glycol and ethyl ether as the first and second exchange solvents. The method was similar to that described in example 1 except that the water to propylene glycol exchange was carried out in step-wise fashion by soaking the membrane in 10, 50, and 100 percent propylene glycol solutions (in water) for 5, 5, and 10 minutes, respectively, and that the exchange time for propylene glycol to ethyl ether was 35 minutes. The dried membrane has the following properties.

helium permeation flux = $2.28 \times 10^{-4}$ cc(STP)/cm$^2$, sec, cm-Hg
helium/methane separation factor = 48

Example 4

This example shows that ether-alcohols may be used as the first exchange solvent.

The Eastman KP-98 membrane was treated at 0°C with 3-methoxy-1-butanol and carbon tetrachloride as the first and second exchange solvents. The water to 3-methoxy-1-butanol exchange was carried out in stepwise fashion by soaking the water-wet membrane in solution of 80 percent 3-methoxy-1-butanol and 20 percent water for 4 minutes, and then in pure 3-methoxy-1-butanol for 6 minutes. The membrane was then immersed in pure carbon tetrachloride for 6 minutes. The replacement operations were similar to that described in example 1. The dried membrane has the following properties helium permeation flux = $1.14 \times 10^{-4}$ cc(STP)/cm$^2$, sec, cm-Hg
helium/methane separation factor = 64

Example 5

This example shows that weakly polar hydrocarbons, halogenated hydrocarbons and ethers may be used as the second solvents. The following data were obtained for Eastman KP-98 membrane treated at 0°C with isopropyl ether as the second solvents. The solvent replacement operations were carried out as set forth in example 1.

| Exchange solvents | Helium Permeation flux cc(STP)/cm$^2$, sec, cm-Hg | Helium/Methane Separation Factor |
|---|---|---|
| isopropanol toluene | $2.33 \times 10^{-4}$ | 56 |
| isopropanol 1,1,2-trichloro-trifluoroethane | $2.65 \times 10^{-4}$ | 45 |
| isopropanol isopropanol ether | $2.11 \times 10^{-4}$ | 57 |

Example 6

This example shows the effect of exchange solvent purity.

Both the helium/methane separation factor and helium permeation flux generally increase with decreasing water content in the exchange alcohol solution. The following data were obtained for KP-96 membranes treated as described under example 1 with various 24°C alcohol-water solutions; 24°C pure hexanes were used as the second exchange solvent.

| ethanol percent | 93 | 94 | 96 | 98 |
|---|---|---|---|---|
| helium flux | $1.35 \times 10^{-6}$ | $3.17 \times 10^{-5}$ | $8.77 \times 10^{-5}$ | $1.33 \times 10^{-4}$ |
| helium/methane separation factor | 16.9 | 40.2 | 48.0 | 58.1 |

It was also found that an alcohol content of up to 8 percent in the hexanes used as the second exchange solvent had little effect on the membrane properties. However, about 8 percent content, both the separation factor and permeation flux decreased with increasing alcohol content.

Example 7

This example shows the effect of liquid exchange temperature on the quality of the dried membrane.

Samples of membranes were treated at various temperatures with isopropanol and n-heptane as the first and second solvent. The procedure was similar to that described in example 1. Following are the properties of the dried membranes.

| Type of Membrane | Exchange Temp. °C | Helium permeation flux, $10^{-4}$ cc(STP)/ cm$^2$, sec, cm-Hg | Helium/methane separation factor | Membrane shrinkage % |
|---|---|---|---|---|
| KP-96 | 21 | 1.50 | 61.2 | |
| | 0 | 2.68 | 63.5 | |
| KP-98 | −30 | 0.0897 | 84.6 | 6.16 |
| | −20 | | | 1.94 |
| | −10 | 2.02 | 44.7 | 1.94 |
| | 0 | 2.48 | 53.3 | 1.94 |
| | 10 | | | 2.26 |
| | 22 | 1.05 | 51.8 | 3.40 |
| | 31 | | | 5.35 |
| | 39 | 0.339 | 62.8 | |
| | 42 | | | 8.75 |

This example shows that there exists an optimum range of solvent exchange temperatures, namely −20°C - 0°C. Beyond this temperature range, the dried membrane has lower permeabilities and higher shrinkage. It appears that the membrane permeability is directly related to the membrane shrinkage; the lower the shrinkage, the better is the membrane.

Example 8

This example shows the effect of solvent exchange time on membrane properties.

The solvent exchange time required depends upon the rate of solvent diffusion through the membrane. Insufficient exchange time will leave some residual water and alcohol in the membrane and it will have poor separation capabilities. The following data show the effect of the solvent exchange time on the properties of the dried membrane. The solvent replacement operations were carried out as described in example 1, except at 24°C and with the specified times. It will be noted that two minutes is sufficient exchange time for ethanol and hexanes.

lium permeation flux of the dried membrane is independent of pressure. But the methane permeation flux increases slightly with increasing pressure, leading to the decrease of helium/methane separation factor as shown in the following table:

|  |  | Pressure, psi | 100 | 200 | 400 | 600 |
|---|---|---|---|---|---|---|
| Sample No. 1 | Methane flux $cc(STP)/cm^2,sec,cm-Hg$ | | $1.00\times10^{-5}$ | $1.02\times10^{-5}$ | $1.08\times10^{-5}$ | $1.12\times10^{-5}$ |
|  | Helium/methane separation factor | | 34.5 | 34.0 | 32.0 | 30.9 |
| Sample No. 2 | Methane flux $cc(STP)/cm^2,sec,cm-Hg$ | | $4.28\times10^{-6}$ | $5.17\times10^{-6}$ | $5.84\times10^{-6}$ | $5.90\times10^{-6}$ |
|  | Helium/methane separation factor | | 58.0 | 48.0 | 42.5 | 42.0 |

Helium flux of sample No. 1 = $3.46 \times 10^{-4} cc(STP)/cm^2,sec,cm-Hg$
Helium flux of sample No. 2 = $2.48 \times 10^{-4} cc(STP)/cm^2,sec,cm-Hg$

Example 9

This example shows the effect of solvent exchange time on membrane shrinkage.

The Eastman KP-98 cellulose acetate membrane was dried using 0°C isopropanol and 0°C n-heptane with several different solvent exchange times. The dried membranes have the following shrinkage. The data show that two minutes time is sufficient for solvent exchange.

| Type of membrane | KP-96 | | | |
|---|---|---|---|---|
| Exchange time (minutes) | | | | |
| 98% ethanol | 2 | 2 | 5 | 15 |
| pure hexanes | 1 | 2 | 5 | 15 |
| Helium permeation flux $cc(STP)/cm^2,sec,cm-Hg$ | $1.21\times10^{-4}$ | $1.63\times10^{-4}$ | $1.47\times10^{-4}$ | $1.44\times10^{-4}$ |
| Helium/methane separation factor | 63 | 60 | 67 | 64 |

| Exchange time (minutes) | | | | | |
|---|---|---|---|---|---|
| isopropanol | 0.5 | 1 | 2 | 5 | 10 |
| n-heptane | 0.5 | 1 | 2 | 5 | 10 |
| Membrane shrinkage,% | 6.97 | 3.57 | 2.43 | 2.26 | 2.26 |

Example 10

This example shows the improvement of the membrane separation capabilities by post-drying heat treatment.

The Eastman KP-98 membrane was treated at 0°C with isopropanol as the first solvent and n-heptane as the second solvent. The solvent replacement operations were carried out as set forth in example 1. The he- Upon tempering the dried membrane in a 95°C oven for 45 minutes, the resulting membrane has a helium permeation flux of $2.53 \times 10^{-4} cc(STP)/cm^2,sec,cm-Hg$, which is about the same as that of the membrane before heat treatment (see sample No. 2). But the methane flux of the heat-treated membrane is only $3.33 \times 10^{-6} cc(STP)/cm^2,sec,cm-Hg$, and is essentially independent of pressure. Consequently the heat-treated membrane has a constant helium/methane separation factor of 75 which is considerably higher than that of the membrane without heat treatment.

Example 11

This example shows that upon rewetting, the treated membrane will regain its original reverse osmosis properties.

The Eastman membranes were treated as described under example 1, with the exception that isopropanol and n-heptane were used as the exchange solvents, and that the membranes were soaked in a surfactant solution of 0.1 percent Triton X 100 in water for 3 minutes prior to the solvent exchange operations. The Triton solution treatment makes the dried membrane relatively easy for rewetting. The following data show that the rewet membranes regain most of their original reverse osmosis properties with the exception of KP-96 membrane treated at ambient temperature.

| The reverse osmosis properties of rewet membranes* | | | | |
|---|---|---|---|---|
| Type of Membrane | Properties | Untreated Membrane | isopropanol n-heptane at 0° C | isopropanol n-heptane at 22° C |
| Eastman KP-96 | Water flux gal/day,ft² | 18 | 17 | 7.5 |
|  | Salt rejection,% | 91 | 91 | 81 |
| Eastman KP-98 | Water flux gal/day,ft² | 16 | 15 | 16 |
|  | Salt rejection % | 92 | 94.5 | 93 |

*Test Conditions: Feed pressure: 600 psi. Feed concentration 0.5% NaCl
Feed flow rate: 20 ml/min over 24 cm² membrane area.

Example 12

This example shows that the membrane drying method described in example 1 may also be applied to the un-annealed asymmetric cellulose acetate hollow fiber.

A bundle of un-annealed asymmetric cellulose acetate hollow fibers of 300 micron OD, 100 micron ID, and 6-foot length was treated at 3°C with isopropanol and n-heptane. The method was similar to that described in example 1 except that the solvent exchange time is 20 minutes in each solvent. The dried fiber has the following properties.

| | |
|---|---|
| Helium permeation flux $10^{-4}$cc (STP)/cm$^2$, sec, cm-Hg | = 0.432 |
| Helium/methane separation factor | = 96.2 |

The permeation flux is based on the outer surface area of the fiber where the active skin layer is located.

Example 13

This example shows that highly annealed asymmetric fibers may be dried by flowing the exchange solvents through the inside of the fiber.

One end of a water-wet asymmetric cellulose acetate hollow fiber bundle annealed at 85°C water was placed inside a 2 inch long ¼ inch O.D. copper tube. The space between the fibers and the inside tube wall was sealed by epoxy. The tube could be connected to a isopropanol container or a n-heptane container. The solvent exchange operation was carried out at 23 C as follows. Isopropanol was forced through the inside of the fiber from the container by applying pressure for 20 minutes. Similarly, n-heptane was forced through the fiber for 20 minutes. Finally the fiber was dried by blowing air through the fiber. The dried fiber was opaque and flexible and had only 3% shrinkage. The membrane has a helium flux of 2.50 × $10^{-5}$cc (STP)/cm$^2$, sec, cm-Hg, and a separation factor of 109.

Example 14

This example shows that highly annealed asymmetric hollow fibers may be properly dried by using solvents of small molecular size.

Asymmetric cellulose acetate hollow fibers of 1 foot length were annealed in 85°C water for 30 minutes. After sealing both ends of the fibers the fibers were treated by 23°C methanol and 0°C ethyl ether for 10 minutes in each solvent; the operation was similar to that described in Example 1. The dried fiber was opaque and flexible and had only 5 percent shrinkage. It is to be noted that the same fiber could not be properly dried by using isopropanol and n-heptane, both of which are of considerably larger molecular size than methanol and ethyl ether.

Example 15

This example shows the effect of solvent exchange temperature on the membrane properties.

Bundles of un-annealed asymmetric cellulose acetate hollow fibers of about 6-foot length were treated, as described in example 1, at different temperatures using isopropanol and n-heptane with 20 minutes solvent exchange time. The dried fibers have the following properties.

| Solvent exchange temperature °C | Helium permeation flux $10^{-4}$cc(STP)/cm$^2$, sec, cm-Hg | Helium/methane separation factor | Fiber shrinkage % |
|---|---|---|---|
| 30 | | | 10.4 |
| 23 | 0.238 | 59.1 | 8.45 |
| 10 | | | 7.77 |
| 4 | 0.432 | 96.2 | 5.57 |
| −10 | 0.527 | 90.1 | 8.11 |
| −20 | | | 9.12 |
| −30 | 0.126 | 114 | |

The above data show that the optimum solvent exchange temperature is between −10°C to 10°C. Within this temperature range, the dried membrane has good combination of permeation flux and separation factor.

Example 16

This example shows the effect of solvent exchange time on the shrinkage of the dried asymmetric cellulose acetate hollow fiber.

Un-annealed hollow fibers of 2-foot length were treated, as described in example 1, using 3°C isopropanol and 3°C n-heptane with several different solvent exchange times. In each case, the fiber ends were sealed off by mechanical means to ensure that the solvent exchange took place through the fiber wall only. The dried fibers have the following shrinkage.

| Solvent exchange time in each solvent (min.) | 0.25 | 0.5 | 1.0 | 2.0 | 5.0 | 10.0 | 20.0 |
|---|---|---|---|---|---|---|---|
| Fiber length shrinkage, % | 20.3 | 19.6 | 17.6 | 12.2 | 7.26 | 6.42 | 5.57 |

It appears that 5 minutes time is sufficient for solvent exchange.

Example 17

This example shows the improvement of separation capability of the dried fiber by a post-drying heat treatment.

The hollow fiber dried in example 12 was tempered in a 95° C oven for 45 minutes. The resulting fiber has a helium permeation flux of $6.21 \times 10^{-5}$ cc(STP)/cm$^2$,sec,cm-Hg and a helium/methane separation factor of 110. The corresponding values before heat treatment are $4.32 \times 10^{-5}$ cc(STP)/cm$^2$,cm-Hg and 96.2 (see example 12).

Example 18

This example shows that upon rewetting, the treated hollow fiber will regain most of its desirable reverse osmosis properties.

The hollow fiber dried in example 12 was rewetted by soaking in water. The resulting hollow fiber has a water flux of 2.6 gallon/ft$^2$, day, with 96 percent sodium chloride rejection at 250 psig test pressure. The corresponding values of the original water-wet fiber annealed at 79° C are 5.4 gfd and 94.6 percent salt rejection.

What is claimed is:

1. A method for drying a water-wet cellulose ester membrane, which comprises:
   immersing the membrane in water-soluble alcohol for a sufficient period of time so as to replace substantially all the water with the alcohol;
   immersing the alcohol-wet membrane in nonpolar alcohol-soluble organic liquid for a sufficient period of time so as to replace the alcohol with the organic liquid;
   drying the organic liquid-wet membrane to produce a dry membrane;
   the temperature of the membrane, the alcohol and the organic liquid being maintained below ambient temperature during replacement so as to stiffen the membrane pore walls during the replacement process.

2. The method as set forth in claim 1 wherein:
   the dried membrane is heat treated to improve its gas separation capabilities.

3. The method as set forth in claim 2 wherein:
   the dried member is heat treated at about 95°C.

4. The method as set forth in claim 1 wherein:
   the alcohol is selected from the group consisting of monohydric alcohols, ether alcohols, and dihydric alcohols;
   and the organic liquid is selected from the group consisting of aliphatic, alicyclic and aromatic hydrocarbons, ethers, halogenated hydrocarbons, and hydrocarbon sulfides.

5. The method as set forth in claim 1 wherein:
   the alcohol is selected from the group consisting of methanol, ethanol, 1-propanol, 2-propanol, tertubtanol and 1-butanol.

6. The method as set forth in claim 1 wherein:
   the alcohol is 3-methoxy-1-butanol.

7. The method as set forth in claim 1 wherein:
   the alcohol is 1,2-propanediol.

8. The method as set forth in claim 5 wherein:
   the organic liquid is selected from the group consisting of pentanes, hexanes, heptanes, octanes.

9. The method as set forth in claim 5 wherein:
   the organic liquid is selected from the group consisting of cyclobutane, cyclopentane, cyclohexane, and 1,3-demethylcyclohexane.

10. The method as set forth in claim 5 wherein:
    the organic liquid is selected from the group consisting of benzene and toluene.

11. The method as set forth in claim 7 wherein:
    the organic liquid is selected from the group consisting of ethyl ether and isopropyl ether.

12. The method as set forth in claim 5 wherein:
    the organic liquid is selected from the group consisting of carbon tetrachloride, and 1, 1, 2-trichlorotrifluoroethane.

13. The method as set forth in claim 5 wherein:
    the organic liquid is carbon disulfide.

14. The method as set forth in claim 6 wherein:
    the organic liquid is ethyl ether.

15. The method as set forth in claim 1 wherein:
    the temperatures during replacement is maintained between $-10°$ C and $10°$ C.

* * * * *